United States Patent
Li et al.

(10) Patent No.: US 12,470,841 B2
(45) Date of Patent: Nov. 11, 2025

(54) ELECTRONIC DEVICE AND CAMERA MODULE THEREOF

(71) Applicant: VIVO MOBILE COMMUNICATION CO., LTD., Dongguan (CN)

(72) Inventors: Peide Li, Dongguan (CN); Rongrong Huang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 205 days.

(21) Appl. No.: 18/215,156

(22) Filed: Jun. 27, 2023

(65) Prior Publication Data
US 2023/0345138 A1   Oct. 26, 2023

Related U.S. Application Data

(63) Continuation of application No. PCT/CN2021/142141, filed on Dec. 28, 2021.

(51) Int. Cl.
*H04N 23/958* (2023.01)
*G02B 27/00* (2006.01)
*H04N 23/11* (2023.01)
*G02B 5/20* (2006.01)
*G03B 11/00* (2021.01)

(52) U.S. Cl.
CPC ....... *H04N 23/958* (2023.01); *G02B 27/0075* (2013.01); *H04N 23/11* (2023.01); *G02B 5/208* (2013.01); *G03B 11/00* (2013.01)

(58) Field of Classification Search
None
See application file for complete search history.

(56) References Cited

U.S. PATENT DOCUMENTS

| | | |
|---|---|---|
| 2002/0122142 A1 | 9/2002 | Lin |
| 2015/0365640 A1 | 12/2015 | Park et al. |
| 2020/0099898 A1 | 3/2020 | Wan |

FOREIGN PATENT DOCUMENTS

| | | |
|---|---|---|
| CN | 102948153 A | 2/2013 |
| CN | 103403494 A | 11/2013 |

(Continued)

OTHER PUBLICATIONS

English translation of JP-2020102825-A, Kaneko, 2020 (Year: 2020).*

(Continued)

*Primary Examiner* — James M Hannett
(74) *Attorney, Agent, or Firm* — IPX PLLC

(57) ABSTRACT

An electronic device and a camera apparatus are provided. The camera apparatus includes a lens, a driving member, a photosensitive chip, and a first refractor; the first refractor can deflect a propagation direction of light, and the first refractor is connected with the driving member. When the first refractor is located at the first position, the first refractor is located outside a path of light incident from the lens and received by the photosensitive chip, the light incident from the lens forms a first image through a first pixel sub-area of the photosensitive chip, when the first refractor is located at the second position, the first refractor is located on the path, and the light incident from the lens passes through the first refractor and forms a second image through a second pixel sub-area of the photosensitive chip.

18 Claims, 3 Drawing Sheets

(56) References Cited

FOREIGN PATENT DOCUMENTS

| | | | |
|---|---|---|---|
| CN | 104079904 A | | 10/2014 |
| CN | 106210677 A | | 12/2016 |
| CN | 110913101 A | | 3/2020 |
| CN | 111602387 A | | 8/2020 |
| CN | 112637473 A | | 4/2021 |
| EP | 3758357 A1 | | 12/2020 |
| JP | 2006054875 A | | 2/2006 |
| JP | 2020102825 A | * | 7/2020 |
| WO | 2020015627 A1 | | 1/2020 |

OTHER PUBLICATIONS

Extended European Search Report issued in related European Application No. 21914416.9, mailed Mar. 25, 2024, 8 pages.
International Search Report issued in corresponding International Application No. PCT/CN2021/142141, mailed Mar. 17, 2022, 6 pages.
First Office Action issued in corresponding CN Patent Application No. 202011639301.0, dated Jul. 29, 2022, 7 pages.
Office Action issued in related European Application No. 21914416.9, mailed Apr. 10, 2025, 6 pages.

* cited by examiner

ELECTRONIC DEVICE AND CAMERA MODULE THEREOF

CROSS-REFERENCE TO RELATED APPLICATIONS

The application is a continuation of International Application No. PCT/CN2021/142141, filed on Dec. 28, 2021, which claims priority to Chinese Patent Application No. 202011639301.0, filed on Dec. 31, 2020. The entire contents of each of the above-identified applications are expressly incorporated herein by reference.

TECHNICAL FIELD

This application relates to the field of communications device technologies, and in particular to an electronic device and a camera module thereof.

BACKGROUND

With the development of technologies, mobile phones and other electronic devices play an important role in people's production and life, and the electronic devices are usually equipped with camera modules to help users take photos. With the increasingly fierce market competition, an electronic device usually has at least one outstanding performance to stand out from other electronic devices, thereby improving the market competitiveness of the electronic device. For example, the electronic device has a high refresh rate, which makes it have a high display performance, the electronic device has two speakers, so that the sound effect is good, or further, the electronic device has high shooting performance. For the shooting performance of the electronic device, performance of a camera module can be improved in many ways.

Using imaging definition as an example, when a size of a photosensitive chip is fixed, increasing a quantity of pixels reduces photosensitivity of the camera module, and also adversely affect an imaging result. Therefore, the industry usually uses single-frame interpolation and multi-frame composition to improve the definition. However, in a process of forming an image by using the single-frame interpolation, because a quantity of real photosensitive pixels does not increase, improvement effect on the definition is limited, and interpolation errors are also prone to occur in some scenes. In a process of forming an image by multi-frame composition, it is difficult to control pixel displacement, and the image quality after the composition is also poor.

SUMMARY

The present application discloses an electronic device and a camera module thereof.

According to a first aspect, an embodiment of the present application discloses a camera module, which includes a lens, a driving member, a photosensitive chip, and a first refractor, where the photosensitive chip is a Bayer array sensor, the photosensitive chip includes a plurality of pixel areas distributed in columns and rows, and each pixel area includes four pixel sub-areas;

the first refractor can deflect a propagation direction of light, the first refractor is connected with the driving member, the driving member can drive the first refractor to move between a first position and a second position, when the first refractor is located at the first position, the first refractor is located outside a path of light incident from the lens and received by the photosensitive chip, the light incident from the lens forms a first image through a first pixel sub-area of the photosensitive chip, when the first refractor is located at the second position, the first refractor is located on the path of the light, and the light incident from the lens passes through the first refractor and forms a second image through a second pixel sub-area of the photosensitive chip; and contents of the first image and the second image are the same, and equivalent pixel sub-areas of the first pixel sub-area and the second pixel sub-area in the same pixel area are any two pixel sub-areas in the pixel area.

According to a second aspect, an embodiment of this application discloses an electronic device, including the foregoing camera module.

The embodiment of the present application provides a camera module. The photosensitive chip is matched with the lens. When the position of the first refractor is different, the light incident from the lens can be projected on the photosensitive chip, a first image may be formed through the first pixel sub-area of the photosensitive chip, and a second image with the same content as the first image is formed through the second pixel sub-area of the photosensitive chip. In addition, the equivalent pixel sub-areas of the first pixel sub-area and the second pixel sub-area in the same pixel area are any two pixel sub-areas of the pixel area, so that in two imaging processes, filtering results of the photosensitive chip for the same incident light are different. Furthermore, a preset algorithm is used to composite the first image and the second image.

BRIEF DESCRIPTION OF DRAWINGS

The accompanying drawings described herein are intended to provide a further understanding of this application, and constitute a part of this application. Example embodiments of this application and descriptions thereof are intended to describe this application, and do not constitute limitations on this application. In the accompanying drawings.

DETAILED DESCRIPTION

The following describes this application with reference to the specific embodiments of this application and the corresponding accompanying drawings. Apparently, the described embodiments are merely some rather than all of embodiments of this application. All other embodiments obtained by a person of ordinary skill in the art based on embodiments of this application without creative efforts shall fall within the protection scope of this application.

Figure 1:
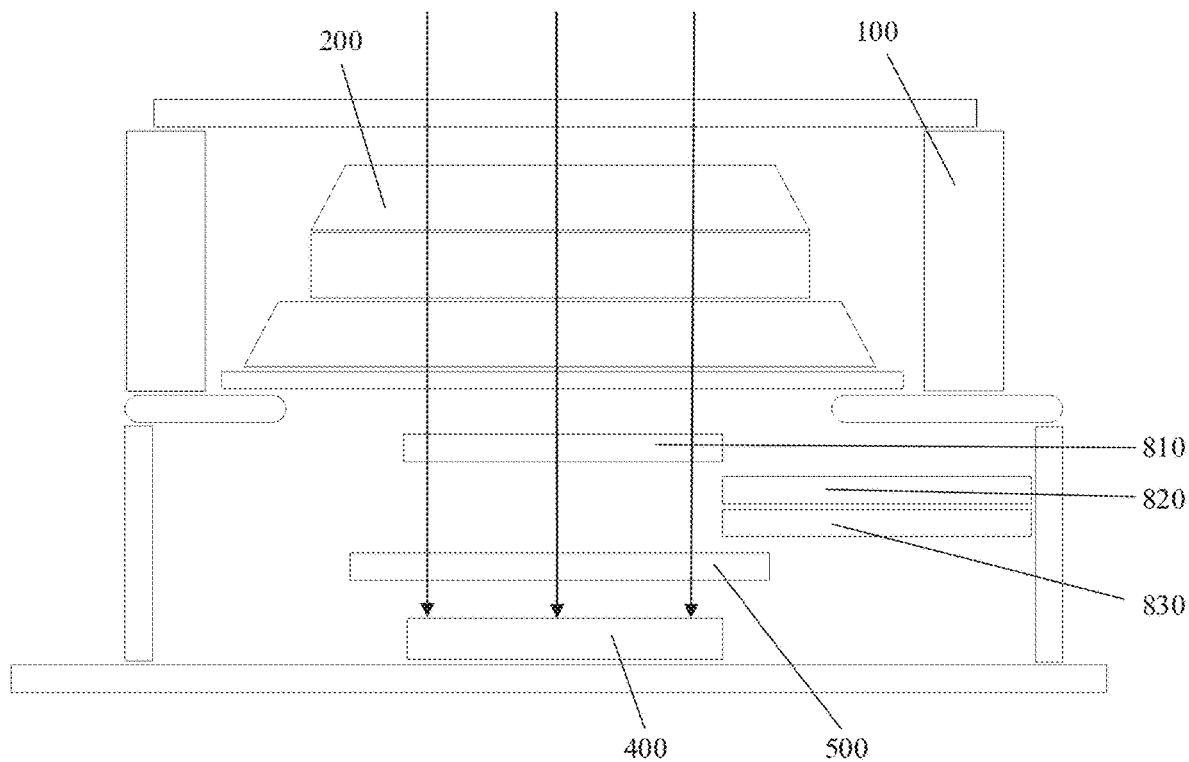
FIG. 1 is a schematic diagram depicting a structure of a camera module according to an embodiment of this application.

As shown in FIG. 1, the present application discloses a camera module, which includes a lens 200, a driving member, a photosensitive chip 400, and a first refractor 810. The camera module may also include other structures such as a housing 100, which will not be repeated herein in consideration of the brevity of the text.

The lens 200 can form a fixed connection relationship with the housing 100 of the camera module by means of bonding or clamping, light outside the camera module can be incident into the camera module through the lens 200, and the lens 200 can provide light distribution for light. The number of lenses in the lens 200 can be determined according to the actual situation. In some implementations, the lens 200 includes a plurality of lenses arranged at intervals, and the axes of the plurality of lenses coincide. In the plurality of lenses, at least one convex lens 200 and at least one concave lens 200 can be included, so as to improve the light distribution effect of the lens 200.

The photosensitive chip 400 is an imaging sensor, and the photosensitive chip 400 is a Bayer array sensor, that is, photosensitive pixels in the photosensitive chip 400 are arranged in a manner of Bayer array. The photosensitive chip 400 includes a plurality of pixel areas distributed in rows and columns, each pixel area includes four pixel sub-areas, and the four pixel sub-areas are arranged in a 2×2 matrix. The four pixel sub-areas may include two green pixels, one blue pixel, and one red pixel, and the two green pixels are arranged diagonally. The four pixel sub-areas in each pixel area may be a first pixel sub-area, a second pixel sub-area, a third pixel sub-area, and a fourth pixel sub-area.

In some implementations, the photosensitive chip can include a filter array layer and a photosensitive layer. Light passes through the filter array layer and irradiates on the photosensitive layer. The filter array layer can filter light and can make the light passing through the filter array layer only retain one color component, such as red, blue, or green.

As mentioned above, the photosensitive chip includes a plurality of pixel areas, and each pixel area includes four pixel sub-areas. In detail, each pixel sub-area is a part of the photosensitive chip, that is, each pixel sub-area may include a filter sub-layer and a photosensitive sub-layer, and the number of pixel sub-areas is multiple. Furthermore, all the filter sub-layers together form the filter array layer, and all the photosensitive sub-layers together form the photosensitive layer.

In the filtering array layer of the Bayer array sensor, a part corresponding to each pixel area is provided with four filters, and the four filters one-to-one correspond to four pixel sub-areas respectively in one pixel area. In addition, the above four filters usually include a red light filter, a blue light filter, and two green light filters, and the four filters are called RGGB for short. In a case that types of the filters disposed in different pixel sub-areas of the photosensitive layer are different, the wavelength of images formed by the areas corresponding to the different pixel sub-areas of the photosensitive layer are also different.

The photosensitive chip 400 can be fixed on the housing 100 of the camera module by bonding or other means, so that the photosensitive chip 400 can be relatively fixed with the lens 200, and then the incident light from the lens 200 can be received by the photosensitive chip 400.

The first refractor 810 has the function of deflecting the propagation direction of the light, that is, after the light passes through the first refractor 810, the light can propagate in another direction deviated from the original propagation direction by a certain angle. The deviation angle is related to a refraction angle of the first refractor 810, and the refraction angle is related to the material and thickness of the refractor, and will not be described in detail in this embodiment of the present application. In some implementations, the first refractor 810 can be made of materials such as glass or plastic, and the thickness of the first refractor 810 can be selected according to actual conditions, which is not limited here.

The first refractor 810 can be connected with a driving member, and the driving member can drive the first refractor 810 to move between a first position and a second position. In some implementations, the driving member can be a linear motor to drive the first refractor 810 to make a linear movement, or the driving member can be a rotary motor to drive the first refractor 810 to make a rotational movement, which can make the position of the first refractor 810 change and move between a first position and a second position.

When the first refractor 810 is located at the first position, the first refractor 810 is located outside a path of the light incident from the lens 200 and received by the photosensitive chip 400, that is, the first refractor 810 can avoid the light received by the photosensitive chip 400. In the above case, the light incident from the lens 200 can form a first image through a first pixel sub-area of the photosensitive chip 400.

When the first refractor 810 is located at the second position, the first refractor 810 is located on the path of the light incident from the lens 200 and received by the photosensitive chip 400, that is, the first refractor 810 can be matched with the photosensitive chip 400, so as to deflect the propagation direction of the light. In this case, light incident from the lens 200 can pass through the first refractor 810 and form a second image through the second pixel sub-area of the photosensitive chip 400. The contents of the first image and the second image are the same, and the equivalent pixel sub-areas of the first pixel sub-area and the second pixel sub-area in the same pixel area are any two pixel sub-areas in the pixel area.

As mentioned above, the first refractor 810 has the ability to deflect the propagation angle of the light, so that when the first refractor is respectively located at the first position and the second position, the projection positions of the light incident from the same position of the lens 200 on the photosensitive chip 400 are different, that is, the light is respectively projected on the first pixel sub-area and the second pixel sub-area. When the first refractor 810 has different refraction abilities, the relative positions of the first pixel sub-area and the second pixel sub-area are also different. When the first refractor 810 has a strong refraction ability, the first pixel sub-area and the second pixel sub-area may be respectively located in two pixel areas.

However, since the first pixel sub-area and the second pixel sub-area both correspond to filters, and the structures of a plurality of pixel areas on the photosensitive chip 400 are the same, the pixel area in which the first pixel sub-area is located certainly includes a pixel sub-area with a filter of the same type as the filter corresponding to the second pixel sub-area. Correspondingly, the pixel area in which the second pixel sub-area is located certainly also includes a pixel sub-area with a filter of the same type as the filter corresponding to the first pixel sub-area. Therefore, the first pixel sub-area can be equivalent to another pixel sub-area in the pixel area in which the second pixel sub-area is located.

Moreover, since the equivalent pixel sub-areas of the first pixel sub-area and the second pixel sub-area in the same pixel area are any two pixel sub-areas in the pixel area, when the first pixel sub-area has an equivalent in the pixel area in which the second pixel sub-area is located, the equivalent of the first pixel sub-area must not be the second pixel sub-area. Correspondingly, when the second pixel sub-area has an equivalent in the pixel area in which the first pixel sub-area is located, the equivalent of the second pixel sub-area must not be the first pixel sub-area.

Taking the light incident from the center of the lens 200 as an example, when the first refractor 810 is located at the first position, the light can be directed toward the first pixel sub-area corresponding to the red filter in the photosensitive chip 400, and when the first refractor 810 is located at the second position, the light can be directed toward the second pixel sub-area corresponding to the green filter in the photosensitive chip 400. Alternatively, when the first refractor 810 is located at the first position, the light can be directed toward the first pixel sub-area corresponding to the blue filter in the photosensitive chip 400, and when the first refractor 810 is located at the second position, the light can be directed toward the second pixel sub-area corresponding to the green filter in the photosensitive chip 400. In some implementations, when the first refractor 810 is located at the first position, the light may be directed toward the first pixel sub-area corresponding to the first green filter in the photosensitive chip 400, and when the first refractor 810 is located at the second position, the light can be directed toward the second pixel sub-area corresponding to the second green filter in the photosensitive chip 400. The red filter is adjacent to the lower area of the first green filter, the red filter is adjacent to the right of the first green filter, the blue filter is adjacent to the upper area of the second green filter, and the blue filter is adjacent to the left of the second green filter, that is, the first green filter and the second green filter are at different positions in one pixel area.

To sum up, a filter processing result of the light obtained by a filter corresponding to the first pixel sub-area in the photosensitive chip 400 is different from a filtering processing result of the light obtained by a filter corresponding to the second pixel sub-area in the photosensitive chip 400. Therefore, the same light can be processed separately by two filters to form two images with the same content but different colors. The first image and the second image formed on the photosensitive chip 400 are composited by a preset algorithm, which can increase real photosensitive pixels of each filter channel on the formed composite image, can further improve the definition of the image, make the image appear better, and improve the final image quality and user experience.

As mentioned above, a relative position between the first pixel sub-area and the second pixel sub-area can be determined according to the refraction ability of the first refractor 810. In some implementations, by selecting the first refractor 810 with appropriate refraction ability, the first pixel sub-area is adjacent to the second pixel sub-area, that is, a distance between the centers of the first pixel sub-area and the second pixel sub-area is a side length of the pixel sub-area, or a diagonal length of the pixel sub-area.

In addition, the refraction direction of the first refractor 810 may be determined according to actual conditions. For example, the first refractor 810 can be refracted to the left and the second pixel sub-area can be located adjacent to the left side of the first pixel sub-area, or the first refractor 810 can be refracted to the lower side and the second pixel sub-area is located adjacent to the lower side of the first pixel sub-area, or the first refractor 810 can be refracted to the lower left side and the second pixel sub-area is adjacent to the lower left side of the first pixel sub-area, that is, the first pixel sub-area and the second pixel sub-area are arranged diagonally.

Figure 2:
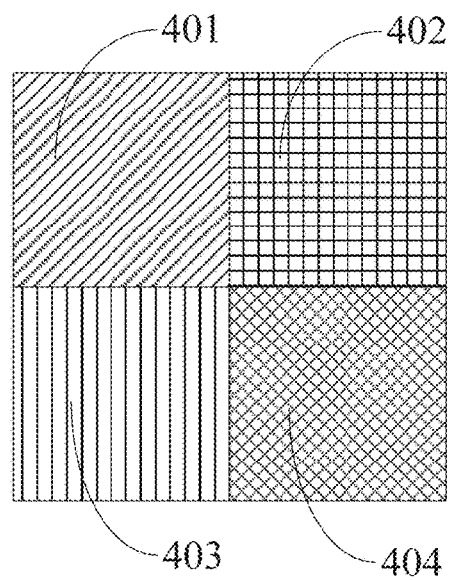
FIG. 2 is a schematic structural view of a pixel area of a photosensitive chip in a camera module according to an embodiment of the present application.

In some implementations, as shown in FIG. 2, FIG. 2 shows the distribution of four pixel sub-areas in each pixel area in the photosensitive chip, which are respectively the first pixel sub-area 401, the second pixel sub-area 402, the third pixel sub-area 403, and the fourth pixel sub-area 404. When the first refractor 810 is located at the first position, the first pixel sub-area 401 can be directed towards the center of the lens, that is, when the first refractor 810 is located at the first position, light incident from the center of the lens can be projected into the first pixel sub-area 401. Correspondingly, after the position of the first refractor 810 changes, the correspondence between the lens and the photosensitive chip also changes. In some implementations, after the first refractor 810 moves to the second position, light incident from the center of the lens is refracted by the first refractor 810, and due to deflection of the propagation direction, can be projected into the second pixel sub-area 402'. Although the second pixel sub-area 402' and the second pixel sub-area 402 may correspond to the same filter, the second pixel sub-area 402' and the second pixel sub-area 402 may be respectively located in two pixel areas, and the pixel area in which the second pixel sub-area 402' is located also includes the first pixel sub-area 401', the third pixel sub-area 403', and the fourth pixel sub-area 404'.

Figure 3:
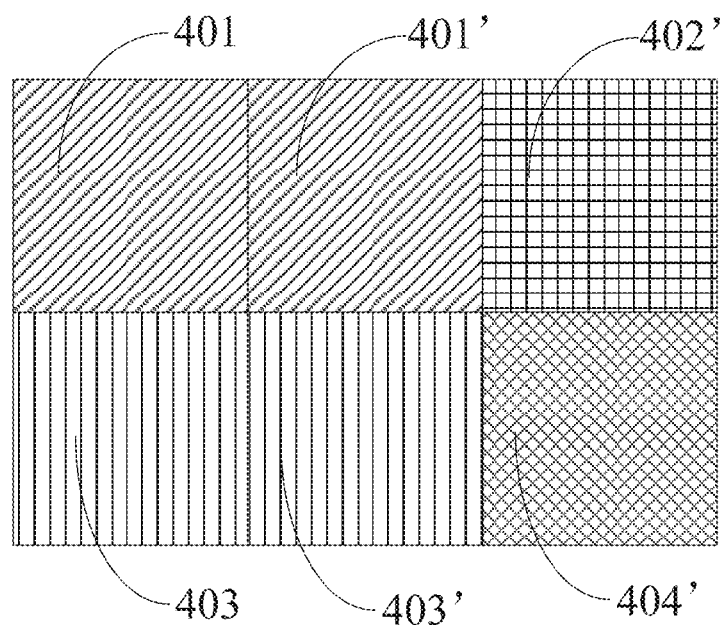
FIG. 3 is a diagram of comparison of relative positions of a pixel area in which a first pixel sub-area is located and a pixel area in which a second pixel sub-area is located in a camera module according to an embodiment of this application.
Figure 4:
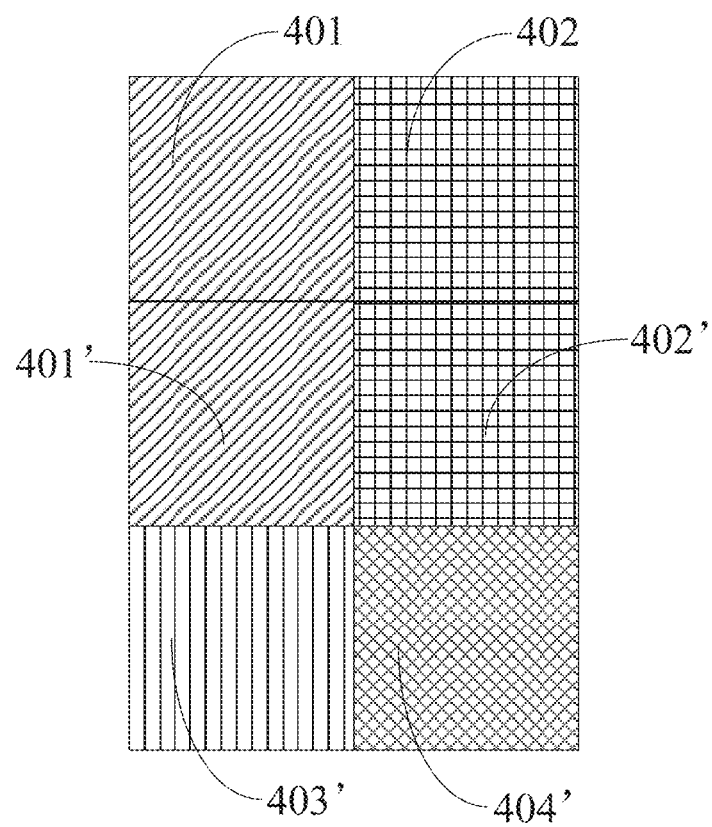
FIG. 4 is another diagram of comparison of relative positions of a pixel area in which a first pixel sub-area is located and a pixel area in which a second pixel sub-area is located in a camera module according to an embodiment of this application.
Figure 5:
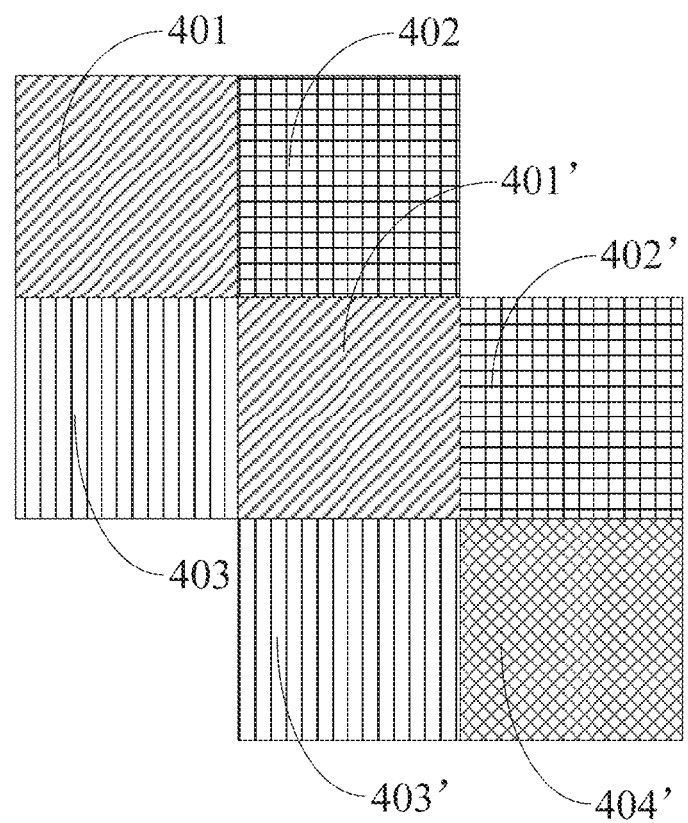
FIG. 5 is still another diagram of comparison of relative positions of a pixel area in which a first pixel sub-area is located and a pixel area in which a second pixel sub-area is located in a camera module according to an embodiment of this application.

When parameters of the first refractor 810 are different, by shifting the landing point of the light to the left or below by an amount equal to the side length of the pixel sub-area, or by shifting the landing point of the light to the lower left by an amount equal to the diagonal length of the pixel sub-area, relative positions between the pixel area in which the first pixel sub-area 401 is located and the pixel area in which the second pixel sub-area 402' is located correspond to FIG. 3 to FIG. 5 respectively.

The embodiment of the present application provides a camera module. The photosensitive chip 400 is matched with the lens 200. When the position of the first refractor 810 is different, the light incident through the lens 200 can be projected on the photosensitive chip 400, and can form a first image through the first pixel sub-area of the photosensitive chip 400, and form a second image having the same content as the first image through the second pixel sub-area of the photosensitive chip 400. In addition, the equivalent pixel sub-areas of the first pixel sub-area and the second pixel sub-area in the same pixel area are any two pixel sub-areas of the pixel area, so that in two imaging processes, filtering results of the photosensitive chip 400 for the same incident light are different. Furthermore, a preset algorithm is used to composite the first image and the second image, the real photosensitive pixels of each filter channel on the formed composite image can be increased, thereby improving the definition of the image and making the image appear better, to improve the final image quality and user experience.

In some implementations, the camera module disclosed in the embodiment of the present application further includes a second refractor 820, and the photosensitive chip 400 can be matched with the lens 200 through the second refractor 820 or the first refractor 810. Similar to the first refractor 810, the second refractor 820 also has the function of deflecting the propagation direction of the light, that is, after the light passes through the second refractor 820, the light can propagate in another direction deviated from the original propagation direction by a certain angle.

The second refractor 820 is connected to the driving member, so that the driving member can drive the second refractor 820 to move between the third position and the fourth position.

When the first refractor 810 is located at the first position and the second refractor 820 is located at the third position, the first refractor 810 is located outside the path of light incident from the lens 200 and received by the photosensitive chip 400, and the second refractor 820 is located on the path of light incident from the lens 200 and received by the photosensitive chip 400, allowing the light incident from the lens 200 to pass through the second refractor 820 and form a third image through the third pixel sub-area of the photosensitive chip 400.

The content of the third image is the same as that of the second image, and also the same as that of the first image. The equivalent pixel sub-areas of the first pixel sub-area, the second pixel sub-area, and the third pixel sub-area in the same pixel area are three pixel sub-areas in the pixel area.

The pattern of the filtering processing result of the same light obtained by the photosensitive chip 400 can be further increased, and the number of real photosensitive pixels of each filter channel in the composite image can be further improved by compositing the first image, the second image, and the third image with a preset algorithm. In some implementations, the types of filters corresponding to the first pixel sub-area, the second pixel sub-area, and the third pixel sub-area can be obtained according to the refraction direction and refraction ability of the first refractor 810 and the second refractor 820. In some implementations, by designing the refraction direction and refraction ability of the first refractor 810 and the second refractor 820, the first pixel sub-area, the second pixel sub-area and the third pixel sub-area can respectively correspond to the green filter, the red filter, and the blue filter, which can improve the definition of the photosensitive pixels corresponding to R, G, and B in the image, so that the effect of the formed image is better.

In addition, when the second refractor 820 is provided, in order to ensure that the first refractor 810 can work normally, when the first refractor 810 is at the second position, the second refractor 820 can be at the fourth position. When the second refractor 820 is located at the fourth position, the second refractor 820 is located outside the path of the light incident from the lens 200 and received by the photosensitive chip 400, thereby preventing the second refractor 820 from impacting the refraction effect of the first refractor 810.

In some implementations, the camera module disclosed in the embodiment of the present application may further include a third refractor 830, and the photosensitive chip 400 may be matched with the lens 200 through the third refractor 830. Similar to the first refractor 810, the third refractor 830 also has the function of deflecting the propagation direction of the light, that is, after the light passes through the third refractor 830, the light can propagate in another direction deviated from the original propagation direction by a certain angle.

The third refractor 830 can be connected to the driving member, and the driving member can drive the third refractor 830 to move between a fifth position and a sixth position.

When the first refractor 810 is at the first position, the second refractor 820 is at the fourth position, and the third refractor 830 is at the fifth position, both the first refractor 810 and the second refractor 820 are located outside the path of light incident from the lens 200 and received by the photosensitive chip 400, the third refractor 830 is located on the path of the light incident from the lens 200 and received by the photosensitive chip 400, and the light incident from the lens 200 passes through the third refractor 830 and forms a fourth image in the fourth pixel sub-area of the photosensitive chip 400.

The contents of the fourth image and the first image are the same, and the equivalent pixel sub-areas of the first pixel sub-area, the second pixel sub-area, the third pixel sub-area, and the fourth pixel sub-area in the same pixel area are four pixel sub-areas in the pixel area.

The pattern of the filtering processing result of the same light obtained by the photosensitive chip 400 can be further increased, and the number of real photosensitive pixels of each filter channel in the composite image can be further improved by compositing the first image, the second image, the third image, and the fourth image with a preset algorithm. In some implementations, compared with the solution in which the light is directly incident on the photosensitive chip, the definition of the R and B images is increased by three times, and the definition of the G image is doubled, so that the clarity of the image has been greatly improved.

In addition, when the third refractor 830 is provided, in order to ensure that both the first refractor 810 and the second refractor 820 can work normally, when the first refractor 810 is located at the second position, or the second refractor 820 is located at the third position, the third refractor 830 can be located at the sixth position. When the third refractor 830 is located at the sixth position, the third refractor 830 is located outside the path of the light incident from the lens 200 and received by the photosensitive chip 400, thereby preventing the third refractor 830 from adversely affecting the refraction effect of the first refractor 810 and the second refractor 820.

In some implementations, the first refractor 810, the second refractor 820, and the third refractor 830 are arranged around the photosensitive chip 400 and move in and out of the optical path along different directions. In another embodiment of the present application, the first refractor 810, the second refractor 820, and the third refractor 830 are arranged at intervals along the axial direction of the lens 200, which can reduce the installation space occupied by the three refractors to a certain extent, and can prevent other components in the camera module from affecting the normal operation of the first refractor 810, the second refractor 820, and the third refractor 830.

As mentioned above, the camera module can include a housing 100, in some implementations, the first refractor 810, the second refractor 820, and the third refractor 830 are all arranged inside the housing 100. On the one hand, the housing can provide reliable protection for the three refractors, ensuring that the positional accuracy of the first refractor 810, the second refractor 820, and the third refractor 830 is relatively high. On the other hand, this can prevent the three refractors from interfering with other components other than the imaging module during operation. In some implementations, an installation space may be provided on one side of the housing 100, so that the first refractor 810, the second refractor 820, and the third refractor 830 are all installed in the installation space.

In some implementations, the photosensitive chip 400 is arranged opposite to the lens 200, that is, the photosensitive surface of the photosensitive chip 400 is arranged perpendicular to the optical axis of the lens 200. In this case, the design and installation difficulty of the lens and the photosensitive chip are relatively low, and this can increase the light sensitivity of the photosensitive chip 400 to improve the imaging effect. In some implementations, in a case that here is a corresponding requirement, the photosensitive chip 400 may unnecessarily be opposite the lens 200. For example, the camera module may be set as a periscope module, which can improve a zoom ratio of the camera module.

As mentioned above, when the first refractor is located at the first position, the first refractor 810 is located on the path of the light. In this case, in some implementations, the first refractor 810 can be arranged on a side of the lens 200 away from the photosensitive chip 400. In another embodiment of the present application, when the first refractor is located at the first position, the first refractor is located between the lens and the photosensitive chip along the optical axis of the lens. This can prevent the first refractor from having an impact on the viewing range of the lens of the camera module, and prevent a light distribution effect of the first refractor from affecting configuration of the lens on the incident light. Besides, when adopting the above technical solution, the refraction effect of the first refractor 810 can be more easily controlled, and the imaging effect can be further improved.

In some implementations, the camera module provided in the embodiment of the present application may also include an infrared filter 500, the infrared filter 500 can provide a filter function for the light incident into the camera module through the lens 200, thereby filtering out unnecessary light projecting into the photosensitive chip 400, preventing the photosensitive chip 400 from producing false colors and/or ripples, and improving the effective definition and color reproduction of the photosensitive chip 400.

In some implementations, the infrared filter 500 can be arranged on the light-incident side of the photosensitive chip 400, or on a side of the lens 200 facing the photosensitive chip 400, so that the light incident into the photosensitive chip 400 can be filtered by the infrared filter 500, and this can reduce the installation difficulty of the infrared filter 500.

In some implementations, the lens 200 is an extended depth of field lens. Passing focuses of R, G, and B filtering channels of the lens 200 are designed to be located at different positions, and the three passing focuses cover three focal segments, so that longitudinal chromatic aberration of the R, G, and B bands is enlarged to cover far, middle, and near distances. The three distances of far, middle, and near are relative concepts, that is, a longer distance is a position farther than a middle distance, and a shorter distance is a position closer than the middle distance.

The lens 200 uses the foregoing technical solution, three pictures correspond to R, G and B, and the three pictures focus on the foregoing three distances, namely, far, middle, and near. After this, based on a restoration algorithm, a window detection function can be used to detect the entire field of view area, and determine which of the three photos corresponding to R, G and B in each window is the clearest. Then, based on the clearest photo, the other two photos can be used for definition transformation with the help of a deconvolution algorithm to composite photos that are relatively clear in any distance.

Based on the camera module disclosed in any of the above embodiments, the embodiment of the present application also provides an electronic device, and the electronic device includes the camera module provided in any of the above embodiments. Of course, the electronic device also includes a display module, a housing, and other devices such as batteries, which will not be introduced one by one herein.

The electronic device disclosed in embodiments of this application may be a smart phone, a tablet computer, an e-book reader, or a wearable device. In some implementations, the electronic device may also be another device. This is not limited in embodiments of this application.

The foregoing embodiments of this application focus on describing differences between the embodiments, and different optimization features of the embodiments may be combined to form better embodiments provided that they are not contradictory. For brevity, details are not described herein again.

The foregoing descriptions are merely embodiments of this application, and are not intended to limit this application. Various changes and modifications may be made to this application by a person skilled in the art. Any modifications, equivalent substitutions, improvements, and the like made within the spirit and principle of this application should be included within the scope of the claims of this application.

The invention claimed is:

1. A camera apparatus, comprising:
   a lens;
   a driving member;
   a photosensitive chip,
   wherein the photosensitive chip is a Bayer array sensor, the photosensitive chip comprises a plurality of pixel areas distributed in columns and rows, and each pixel area comprises four pixel sub-areas; and
   a first refractor and a second refractor each configured to deflect a propagation direction of light, and movable by the driving member,
   wherein when the first refractor and the second refractor are located outside a path of light incident from the lens and received by the photosensitive chip, the light incident from the lens forms a first image through a first pixel sub-area of the photosensitive chip,
   wherein when the first refractor is located on the path of the light and the second refractor is located outside the path of the light, and the light incident from the lens passes through the first refractor and forms a second image through a second pixel sub-area of the photosensitive chip,
   wherein when the first refractor is located outside the path of the light and the second refractor is located inside the path of the light, the light incident from the lens passes through the second refractor and forms a third image through a third pixel sub-area of the photosensitive chip, and
   wherein contents of the first image, the second image, and the third image are the same, and equivalent pixel sub-areas of the first pixel sub-area, the second pixel sub-area, and the third pixel sub-area in the same pixel area are any three pixel sub-areas in the pixel area.

2. The camera apparatus according to claim 1,
   wherein each of the first refractor and the second refractor is connected to the driving member, the driving member is configured to drive the first refractor to move between a first position and a second position, and drive the second refractor to move between a third position and a fourth position,
   wherein when the first refractor is at the first position and the second refractor is at the third position, the first refractor is located outside the path of the light and the second refractor is located inside the path of the light,
   wherein when the first refractor is at the first position and the second refractor is at the fourth position, the first refractor and the second refractor are located outside a path of light, and
   wherein when the first refractor is at the second position and the second refractor is at the fourth position, the first refractor is located on the path of the light and the second refractor is located outside the path of the light.

3. The camera apparatus according to claim 2, further comprising:
a third refractor, wherein the third refractor is configured to deflect a propagation direction of light, the third refractor is connected to the driving member, the driving member is configured to drive the third refractor to move between a fifth position and a sixth position,
wherein when the first refractor is at the first position, the second refractor is at the fourth position, and the third refractor is located at the fifth position, both the first refractor and the second refractor are located outside the path of the light and the third refractor is located on the path of the light, and the light incident from the lens passes through the third refractor and forms a fourth image through a fourth pixel sub-area of the photosensitive chip, and
wherein contents of the fourth image and the first image are the same, and equivalent pixel sub-areas of the first pixel sub-area, the second pixel sub-area, the third pixel sub-area, and the fourth pixel sub-area in the same pixel area are four pixel sub-areas in the pixel area.

4. The camera apparatus according to claim 3, wherein the first refractor, the second refractor, and the third refractor are arranged at intervals along the optical axis of the lens.

5. The camera apparatus according to claim 3, further comprising:
a housing, wherein the first refractor, the second refractor, and the third refractor are all arranged within the housing.

6. The camera apparatus according to claim 1, wherein the photosensitive chip is disposed opposite to the lens.

7. The camera apparatus according to claim 2, wherein when the first refractor is located at the first position, the first refractor is located between the lens and the photosensitive chip along the optical axis of the lens.

8. The camera apparatus according to claim 1, further comprising:
an infrared filter, wherein the infrared filter is arranged on a light-incident side of the photosensitive chip.

9. The camera apparatus according to claim 1, wherein the lens is an extended depth-of-field lens.

10. An electronic device, comprising: a camera apparatus, wherein the camera apparatus comprises:
a lens;
a driving member;
a photosensitive chip,
wherein the photosensitive chip is a Bayer array sensor, the photosensitive chip comprises a plurality of pixel areas distributed in columns and rows, and each pixel area comprises four pixel sub-areas; and
a first refractor and a second refractor each configured to deflect a propagation direction of light, and movable by the driving member,
wherein when the first refractor and the second refractor are located outside a path of light incident from the lens and received by the photosensitive chip, the light incident from the lens forms a first image through a first pixel sub-area of the photosensitive chip,
wherein when the first refractor is located on the path of the light and the second refractor is located outside the path of the light, the light incident from the lens passes through the first refractor and forms a second image through a second pixel sub-area of the photosensitive chip,
wherein when the first refractor is located outside the path of the light and the second refractor is located inside the path of the light, the light incident from the lens passes through the second refractor and forms a third image through a third pixel sub-area of the photosensitive chip, and
wherein contents of the first image, the second image, and the third image are the same, and equivalent pixel sub-areas of the first pixel sub-area, the second pixel sub-area, and the third pixel sub-area in the same pixel area are any three pixel sub-areas in the pixel area.

11. The electronic device according to claim 10, wherein each of the first refractor and the second refractor is connected to the driving member, the driving member is configured to drive the first refractor to move between a first position and a second position and drive the second refractor to move between a third position and a fourth position,
wherein when the first refractor is at the first position and the second refractor is at the third position, the first refractor is located outside the path of the light and the second refractor is located inside the path of the light,
wherein when the first refractor is at the first position and the second refractor is at the fourth position, the first refractor and the second refractor are located outside a path of light, and
wherein when the first refractor is at the second position and the second refractor is at the fourth position, the first refractor is located on the path of the light and the second refractor is located outside the path of the light.

12. The electronic device according to claim 11, wherein the camera apparatus further comprises:
a third refractor, wherein the third refractor is configured to deflect a propagation direction of light, the third refractor is connected to the driving member, the driving member is configured to drive the third refractor to move between a fifth position and a sixth position,
wherein when the first refractor is at the first position, the second refractor is at the fourth position, and the third refractor is located at the fifth position, both the first refractor and the second refractor are located outside the path of the light and the third refractor is located on the path of the light, and the light incident from the lens passes through the third refractor and forms a fourth image through a fourth pixel sub-area of the photosensitive chip, and
wherein contents of the fourth image and the first image are the same, and equivalent pixel sub-areas of the first pixel sub-area, the second pixel sub-area, the third pixel sub-area, and the fourth pixel sub-area in the same pixel area are four pixel sub-areas in the pixel area.

13. The electronic device according to claim 12, wherein the first refractor, the second refractor, and the third refractor are arranged at intervals along the optical axis of the lens.

14. The electronic device according to claim 12, wherein the camera apparatus further comprises:
a housing, wherein the first refractor, the second refractor, and the third refractor are all arranged within the housing.

15. The electronic device according to claim 10, wherein the photosensitive chip is disposed opposite to the lens.

16. The electronic device according to claim 11, wherein when the first refractor is located at the first position, the first refractor is located between the lens and the photosensitive chip along the optical axis of the lens.

17. The electronic device according to claim 10, wherein the camera apparatus further comprises:

an infrared filter, wherein the infrared filter is arranged on a light-incident side of the photosensitive chip.

18. The electronic device according to claim 10, wherein the lens is an extended depth-of-field lens.

\* \* \* \* \*